United States Patent
Wietelmann et al.

(10) Patent No.: US 10,160,036 B2
(45) Date of Patent: Dec. 25, 2018

(54) STABILIZED LITHIUM METAL FORMATIONS COASTED WITH A SHELL CONTAINING NITROGEN, AND A METHOD FOR THE PRODUCTION OF SAME

(71) Applicant: Rockwood Lithium GmbH, Frankfurt am Main (DE)

(72) Inventors: Ulrich Wietelmann, Friedrichsdorf (DE); Christoph Hartnig, Eppstein (DE); Ute Emmel, Frankfurt am Main (DE); Vera Nickel, Haiger (DE)

(73) Assignee: ALBEMARLE GERMANY GMBH, Frankfurt am Main (DE)

( * ) Notice: Subject to any disclaimer, the term of this patent is extended or adjusted under 35 U.S.C. 154(b) by 211 days.

(21) Appl. No.: 14/785,237

(22) PCT Filed: Apr. 17, 2014

(86) PCT No.: PCT/EP2014/057886
§ 371 (c)(1),
(2) Date: Oct. 16, 2015

(87) PCT Pub. No.: WO2014/170429
PCT Pub. Date: Oct. 23, 2014

(65) Prior Publication Data
US 2016/0121396 A1 May 5, 2016

(30) Foreign Application Priority Data
Apr. 19, 2013 (DE) .................. 10 2013 006 724

(51) Int. Cl.
| B22F 1/00 | (2006.01) |
| C01B 21/06 | (2006.01) |
| C01D 15/00 | (2006.01) |
| C01B 21/092 | (2006.01) |
| H01M 4/36 | (2006.01) |
| H01M 4/38 | (2006.01) |
| H01M 4/62 | (2006.01) |
| B22F 1/02 | (2006.01) |
| H01M 10/052 | (2010.01) |
| H01M 4/134 | (2010.01) |
| H01M 4/02 | (2006.01) |

(52) U.S. Cl.
CPC .......... B22F 1/0088 (2013.01); B22F 1/0003 (2013.01); B22F 1/02 (2013.01); C01B 21/061 (2013.01); C01B 21/0926 (2013.01); C01D 15/00 (2013.01); H01M 4/366 (2013.01); H01M 4/382 (2013.01); H01M 4/628 (2013.01); B22F 2201/016 (2013.01); B22F 2201/02 (2013.01); B22F 2301/054 (2013.01); B22F 2302/45 (2013.01); B22F 2999/00 (2013.01); C01P 2006/80 (2013.01); H01M 4/134 (2013.01); H01M 10/052 (2013.01); H01M 2004/027 (2013.01)

(58) Field of Classification Search
CPC .... H01M 4/0404; B22F 1/0062; B22F 1/0085
USPC .......................... 320/137; 75/331; 252/182.1
See application file for complete search history.

(56) References Cited

U.S. PATENT DOCUMENTS

| 2,910,347 A | 10/1959 | Esmay | |
| 4,229,354 A | 10/1980 | Bogdanovic | |
| 2007/0006680 A1* | 1/2007 | Dover | ................... B22F 1/0085 75/331 |
| 2008/0160291 A1 | 7/2008 | Hirai et al. | |
| 2010/0156353 A1* | 6/2010 | Iyer | ..................... H01M 4/0404 320/137 |
| 2013/0181160 A1* | 7/2013 | Wietelmann | .......... B22F 1/0062 252/182.1 |

OTHER PUBLICATIONS

Marshall, Mary C., "Microencapsulation of Lithium", U.S. Army Belvoir Research and Development Center, Defense Technical Information Center Technical Report, Jan. 1, 1985 (42 pages).
Wu, Meifen, et al., "Electrochemical behaviors of a Li3N modified Li metal electrode in secondary lithium batteries", Journal of Power Sources, vol. 196, No. 19, May 16, 2011, p. 8091-8097 (7 pages).

* cited by examiner

Primary Examiner — Khanh T Nguyen
(74) Attorney, Agent, or Firm — Jeremy J. Kliebert

(57) ABSTRACT

The invention relates to particulate lithium metal formations having a substantially spherical geometry and a core composed of metallic lithium, which are enclosed with an outer passivating but ionically conductive layer containing nitrogen. The invention further relates to a method for producing lithium metal formations by reacting lithium metal with one or more passivating agent(s) containing nitrogen, selected from the groups $N_2$, $N_xH_y$ with $x=1$ or 2 and $y=3$ or 4, or a compound containing only the elements C, H, and N, and optionally Li, at temperatures in the range between 60 and 300° C., preferably between 100 and 280° C., and particularly preferably above the melting temperature of lithium of 180.5° C., in an inert organic solvent under dispersion conditions or in an atmosphere that contains a gaseous coating agent containing nitrogen.

19 Claims, No Drawings

STABILIZED LITHIUM METAL FORMATIONS COASTED WITH A SHELL CONTAINING NITROGEN, AND A METHOD FOR THE PRODUCTION OF SAME

Particulate lithium metal composite materials stabilized with a coating containing nitrogen and having a core-shell structure, and a method for producing same are described.

Lithium is one of the alkali metals. Like the heavy element homologs of the first main group of the periodic table, lithium is characterized by strong reactivity with a variety of substances. It thus reacts violently with water, alcohols, and other substances containing protic hydrogen, often with ignition. It is unstable in air and reacts with oxygen, nitrogen, and carbon dioxide. It is therefore normally handled under inert gas (noble gases such as argon) and/or is stored under a protective layer of paraffin oil.

Lithium also reacts with many functionalized solvents, even if they do not contain protic (acidic, positively polarized) hydrogen. For example, cyclic ethers such as THF are opened by ring cleavage, and esters and carbonyl compounds are lithiated and/or reduced. The reaction between the above-mentioned chemicals and/or substances in the environment is often catalyzed by water. Lithium metal can therefore be stored and processed in dry air for long periods of time, since it forms a fairly stable passivation layer that prevents most corrosion. Lithium reacts only very slowly with dry nitrogen at room temperature. This is also true of functionalized solvents, for example N-methyl-2-pyrrolidone, which is much less reactive with lithium in anhydrous form than lithium with a water content of more than a few 100 ppm, for example.

A number of corrosion-reducing coating methods have been developed to increase the storage life of lithium metal and safety in processing. For example, it is known from U.S. Pat. No. 5,567,474 and U.S. Pat. No. 5,776,369 to treat molten lithium metal with $CO_2$. For the coating, molten lithium in an inert hydrocarbon is typically brought into contact with at least 0.3% mol $CO_2$ for at least one minute. However, the resulting protection is not sufficient for many applications, in particular for prelithiation of battery electrode materials in N-methyl-2-pyrrolidone (NMP) suspension.

Another method for stabilizing lithium metal provides for heating it above its melting point, agitating the molten lithium, and bringing it into contact with a fluorination agent, for example perfluoropentylamine (WO 2007/005983 A2). It is disadvantageous that fluorinating agents are often toxic or caustic and therefore tend to be avoided in industrial practice.

A method for protective surface treatment of lithium metal is known from the document WO 2008/045557 A1, according to which lithium metal is coated with a wax layer, for example a polyethylene wax. It is disadvantageous that a relatively large amount of coating agent must be applied. This amount is approximately 1% by weight in the examples in the cited patent application.

US 2008/0283155 A1 describes a method for stabilizing lithium metal, which is characterized by the following steps:
a) heating lithium metal above the melting point to produce molten lithium metal;
b) dispersing the molten lithium metal, and
c) bringing the molten lithium metal into contact with a phosphorus-containing substance to produce an essentially continuous protective layer of lithium phosphate on the lithium metal powder. Handling acidic, caustic substances (phosphoric acid) in general, and in particular in the presence of lithium metal, is disadvantageous, since the two substances react very violently with one another when brought into contact and release a substantial amount of heat. In addition, the reaction of lithium metal with phosphoric acid produces hydrogen gas.

US 2009/0061321 A1 proposes the production of a stabilized lithium metal powder having an essentially continuous polymer coating. The polymer may be selected from the group of polyurethanes, PTFE, PVC, and polystyrene, among others. One disadvantage of this method is that the protected lithium metal acquires an undefined surface coating of organic substances which can interfere during its subsequent use, for example for prelithiation of electrode materials.

The document WO 2012/052265 describes a stabilized, pure lithium metal powder in which lithium metal powder having a sodium content of <200 ppm, preferably <100 ppm, is passivated with fatty acids or fatty acid esters in an inert organic solvent under dispersion conditions. A material produced in this manner has a carbonate-containing surface coating ($Li_2CO_3$). It is known that oxygen-containing lithium salts are electronic insulators, i.e., that the charge transport is kinetically inhibited by boundary layers having such a composition.

In addition, an anode for an electrochemical cell is known which contains a metallic material having an oxygen-based coating and which has an additional protective layer that is formed by reacting D- or P-block precursors with this oxygen-containing layer (WO 2010/101856 A1, US 2007/0082268 A1, US 2009/0220857 A1). The protective layer of the metal anode material is produced by treating a metallic material, having a coating that contains oxygen, with at least two compounds. The first compound is a large molecular compound and the second compound is a small molecular compound (U.S. Pat. No. 7,776,385 B2, US 2011/0104366 A1). With this type of protective layer formation, surface groups that contain oxygen (for example, hydroxyl functions) react with the D- or P-block precursors, for example a silicic acid ester, in a nonhydrolytic sol-gel process, forming a film composed of $SiO_2$ on the anode surface. The chemical reactions may be formulated as follows (G. A. Umeda et al., J. Mater. Chem. 2011, 21, 1593-1599):

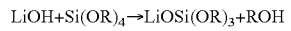

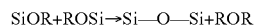

(Si=silyl group with three substituents, for example methyl)

One disadvantage of this method is that it takes place in multiple steps; i.e., first the metallic material, for example lithium metal, is provided with a layer containing oxygen, and is then reacted in succession with two different molecular compounds (D- or P-block precursors).

Lastly, U S 2012/0003532 describes a protected metal anode architecture and a method for producing same, wherein the metal anode layer is a metal selected from the group of alkali metals and alkaline earth metals, and the organic protective film contains the reaction product of the metal and an electron donor compound. The temperature for producing the protective film may be between −20 and 60° C., the optimal temperature being 25±1° C. In the examples, a pretreatment with nitrogen gas is sometimes carried out, the contact time being 1 h or 5 h. The method is also described elsewhere (M. Wu, J. Power Sources 196 (2011) 8091). It is known that metallic lithium does not react with dry nitrogen to an appreciable extent at mild temperatures. Therefore, metallic lithium may be processed in dry air and processed to form thin foils, for example. The nitrogen content of such a lithium metal contacted with nitrogen for several hours is consequently very low (<0.05% by weight).

Although some methods according to the prior art are able to provide a powder which is easily handled and kinetically resistant to reactive solvents such as NMP up to temperatures of approximately 60-80° C., the current carrying capacity of lithium powder anodes produced therefrom is relatively poor. This may be a function of the poor ionic conductivity of the surface coatings. When the known coating agents are used, oxygen-containing lithium salts, which have extremely low conductivity, i.e., which represent insulators, form at the interface with metallic lithium. Thus, for example, lithium oxide has an ionic conductivity of only $1.5 \times 10^{-9}$ S/cm (B. A. Boukamp and R. A. Huggins, Phys. Lett. 72A (1979) 464); for $Li_3PO_4$, a value of $8.2 \times 10^{-15}$ S/cm is stated (A. M. Al-Rikabi, J. Chem. Soc. Pak. 11 (1989) 1-3).

The object of the invention is to provide particulate lithium metal formations having a passivating top coat but good ionic conductivity, and a method for producing these metal formations.

Such lithium metal formations should be stable in the presence of polar reactive solvents such as those used for the production of electrode coatings, for example NMP. at least up to approximately 50° C. for several hours, and in the presence of standard liquid electrolyte systems, up to at least 100° C. According to the invention, the object is achieved in that the lithium metal formation contains a core composed of metallic lithium, which is enclosed by an outer layer (shell) containing nitrogen and optionally hydrogen and/or carbon. The lithium metal formations according to the invention preferably have a substantially spherical geometry, and are produced by bringing metallic lithium into contact with one or more nitrogen-containing passivating agent(s) selected from the groups $N_2$ $N_xH_y$ with x=1 or 2 and y=3 or 4 or a compound containing only the elements C, H, and N, and optionally Li at temperatures between 60 and 300° C., preferably above the melting point of lithium, in an organic solvent or in an atmosphere that contains a gaseous coating agent containing nitrogen. The products produced according to the invention contain between 0.01 and 10% by weight, preferably between 0.1 and 5% by weight, nitrogen, which is present essentially in the outer shell.

As the lithium source, a pure grade, i.e., in particular a grade low in sodium, is preferably used. Such metal grades are available commercially as "battery grade." The Na content is generally <200 ppm, preferably <100 ppm, particularly preferably <50 ppm.

It has surprisingly been found that particularly stable products that can be handled safely may be obtained when low-sodium lithium metal is used. It has been demonstrated by X-ray diffractometry that in particular lithium nitride ($Li_3N$) and tetralithiumammonium hydride ($NLi_4)H$) are formed in the reaction between lithium metal and one or more of the mentioned compounds. It is known that many nitrogen-lithium compounds have good ion conductivity even at room temperature, for example:

| Lithium compound | Ionic conductivity (S/cm) | Literature |
|---|---|---|
| $Li_3N$ | $10^{-3}$ | U. v. Alpen, J. Solid State Chem. 29 (1979) 379-92 |
| $Li_2NH$ | $3 \times 10^{-4}$ | B. A. Boukamp, R. A. Huggins, Phys. Lett. 72A (1979) 464. |

The reaction between the lithium metal and one or more of the passivating agents according to the invention takes place in the temperature range between 60 and 300° C., preferably between 100 and 280° C. Molten lithium is very particularly preferably used; i.e., the reaction temperature is at least 180.5° C., and substantially spherical lithium particles (i.e., lithium powder or granules made up of spherical particles) are produced and treated in the molten form with one or more of the passivating agents according to the invention.

In a very particularly preferred production variant, the lithium is first heated to above the melting point of lithium (180.5° C.) under inert gas (noble gas, for example dry argon) in an inert organic solvent or solvent mixture (generally hydrocarbon-based). This process may take place at standard pressure when solvents having boiling points >180° C. (for example, undecane, dodecane, or corresponding commercially available mineral oil mixtures, for example, Shellsols®) are used. On the other hand, if hydrocarbons having a higher volatility, for example hexane, heptane, octane, decane, toluene, ethylbenzene, or cumene are used, the melting process takes place in a closed vessel under pressurized conditions.

After melting is complete, an emulsion of the metal in hydrocarbon is prepared. Depending on the desired particle geometries (diameter), this is accomplished by homogenization using agitating tools which introduce the required shear forces for the particular formation. For example, if a powder having particle sizes of less than 1 mm is to be produced, a dispersion disk, for example, may be used. The exact dispersion parameters (i.e., primarily the rotational speed and the dispersion time) depend on the desired particle size. The dispersion parameters also depend on the viscosity of the dispersing solvent as well as individual geometric parameters of the agitating element (diameter, exact position, and size of the teeth, for example). Fine tuning of the dispersion process for providing the desired particle distribution is easily accomplished by those skilled in the art via appropriate experiments.

If lithium particles in a grain size range between 5 and 200 μm are to be produced, the agitation speed is generally between 1,000 and 30,000 revolutions per minute (rpm), preferably between 2,000 and 20,000 rpm. The dispersion time, i.e., the period of time within which the dispersion tool runs at full power, is between 1 and 60 minutes, preferably between 2 and 30 minutes. If particularly finely divided particles are desired, extremely high-speed special tools may be used, for example, one that is commercially available under the trade name Ultra-Turrax. It is also possible to produce lithium dispersions using a reaction mixing pump.

The passivating agent together with the metal and the solvent may already be added before the start of the heating phase. However, the passivating agent is preferably added only after melting the metal, i.e., at temperatures >180.5° C. The addition may be carried out in one portion during the dispersion process. However, the passivating agent is preferably added over a period of approximately 5 s to 5000 s, particularly preferably 30 s to 1000 s.

Alternatively, the particles may be produced by an atomization process. In this case, molten lithium is sprayed into an inert gas atmosphere (composed of argon, for example). The metal powder obtained after cooling and solidification may then be dispersed in an inert organic solvent (generally a hydrocarbon) and reacted with one or more of the passivating agents according to the invention at temperatures above 60° C., but below the melting point of lithium. In a further method variant, the molten lithium is injected into an atmosphere containing a gaseous coating agent containing nitrogen.

Gaseous sources of nitrogen, particularly preferably elemental nitrogen or ammonia, liquid compounds such as hydrazine, or substances that are capable of releasing nitrogen, for example metal azides, preferably lithium azide ($LiN_3$) or organic azides ($RN_3$), are preferably used as passivating agent. In addition, nitrogen-containing organic substances which contain no other chemical elements besides C, H, Li, and N may be used. Examples are primary, secondary, or tertiary aliphatic amines $NR^1R^2R^3$, where $R^1$, $R^2$ independently stand for H or an aliphatic group containing 1-12 C atoms or an aromatic group containing at least 6 C atoms, and $R^3$ independently stands for an aliphatic group containing 1-12 C atoms or an aromatic group containing at least 6 C atoms; nitrogen-containing 3- to 6-membered heterocycles such as azirines, aziridines, pyrrolidines, pyrroles, N-methylpyrrole, pyridines, imidazole; or lithium salts of a primary or secondary aliphatic or aromatic amine, for example lithium diisopropyl amide; lithium pyrrolidide.

The nongaseous passivating agents are added to the mixture of lithium metal and the aprotic inert solvent either in pure form or dissolved in a solvent that is inert with respect to lithium metal (hydrocarbons, for example) or in a less reactive aprotic solvent (an ether, for example). The addition of the passivating agent is followed by a post-reaction phase during which the reaction is completed. The duration of the post-reaction phase depends on the reaction temperature and the reactivity of the selected passivating agent with respect to the lithium metal.

The average particle size of the metal powders according to the invention is 5000 μm maximum, preferably 1000 μm maximum, and particularly preferably 300 μm maximum.

The spherical core/shell-structured metal powder particles according to the invention very particularly preferably have average particle sizes between 20 and 100 μm. Assuming an exact spherical geometry, and assuming that the nitrogen is present as lithium nitride, and with knowledge of the densities of lithium metal and lithium nitride (0.54 g/mL and 1.3 g/mL, respectively), the thickness of the nitrogen-containing shell may be computationally estimated from the nitrogen content. For example, a coated metal powder according to the invention composed of particles having a diameter of 50 μm has a shell thickness of approximately 0.01 μm, approximately 0.5 μm, or approximately 1.0 μm for nitrogen contents of 0.1% by weight, 5% by weight, and 10% by weight, respectively. Spherical lithium metal particles having a core/shell structure have proven to have good handling characteristics and to be stable in polar aprotic solvents when they have a nitrogen-containing shell with a thickness between 0.01 and 1 μm.

However, the methods according to the invention are also suitable for passivation of nonspherical lithium metal formations, for example lithium foil. In this case, the passivation is carried out with the coating agents according to the invention at temperatures below the melting point of lithium, but above a temperature of 60° C.

Within the meaning of the invention, it is also possible to carry out a multistep passivation in which, at least in one step, one or more of the nitrogen-containing passivating agent(s) according to the invention is/are used. For example, passivation may first be carried out according to the prior art using fatty acids or fatty acid esters, and the resulting particulate lithium metal may be stabilized even further by an additional coating with one of the nitrogen-containing passivating agents according to the invention. This additional passivation is carried out, for example, in a hydrocarbon solvent in a temperature range between room temperature and 250° C., preferably above 60° C., but below the melting point of lithium (i.e., <180.5° C.). In the case of gaseous or liquid nitrogen-containing passivating agents, however, the additional passivation may also take place by bringing the prepassivated particulate lithium metal into contact with the pure nitrogen-containing coating agents in a temperature range between room temperature and 250° C., preferably above 60° C., but below the melting point of lithium (i.e., <180.5° C.).

The optimal quantity of passivating agent used for the surface coating depends on the particle size, the chemical structure of the passivating agent, and the desired layer thickness. In general, the molar ratio of Li metal to passivating agent is 100:0.01 to 100:10, preferably 100:0.05 to 100:5. Lithium metal products having contents >80%, preferably >90%, result when the preferred quantity of passivating agent is used.

Low-sodium lithium metal powders which have been passivated according to the invention have surprisingly proven to be very particularly stable in contact with reactive polar solvents such as N-methyl-2-pyrrolidone.

The lithium metal powders according to the invention surprisingly do not exhibit a significant exothermic effect in the DSC test in suspension with N-methyl-2-pyrrolidone (water content less than approximately 200 ppm) when stored for at least 15 hours at 50° C., particularly preferably at 80° C., and in particular do not exhibit a "runaway" phenomenon. This behavior is explained with reference to the following examples. In contact with the solvents customarily used for lithium batteries, for example carboxylic acid esters and electrolytes, for example solutions of the conducting salts lithium hexafluorophosphate ($LiPF_6$) or lithium bis(oxalato)borate (LiBOB), the products passivated according to the invention are stable up to at least 100° C., preferably up to at least 120° C.

The spherical lithium metal particles passivated according to the invention may be used for prelithiation of electrochemically active materials, for example graphite anodes, alloy anodes, or conversion anodes for lithium batteries, or in combination with a mechanical-physicochemical pretreatment (pressing, mixing with binder materials, etc.) for the production of metal anodes for lithium batteries.

The invention is explained in greater detail below on the basis of three examples and one comparative example, without thereby limiting the claimed scope of the embodiments.

The product stability was determined by differential scanning calorimetry (DSC). An apparatus from Systag, Switzerland (the Radex system) was used. Approximately 2 g NMP, battery solvent or electrolyte solution, and 0.05 g of the lithium metal powder according to the invention, passivated with a nitrogen-containing coating agent, were weighed into the sample containers under a protective gas atmosphere. Samples were stored for 15 hours at certain temperatures, or dynamically up to a certain end temperature, for example 250° C. The particle size distribution was determined using the Lasentec FBRM inline analyzer from Mettler-Toledo. The temperature at which thermal decomposition begins is designated as $T_{onset}$.

EXAMPLE 1: Production of a Lithium Metal Powder Passivated With Elemental Nitrogen 499 g Shellsol® D100 and 20.3 g lithium metal rod sections were placed in a dry 2-L stainless steel double-jacketed reactor equipped with a dispersion agitator mechanism and inerted with argon. The lithium had a sodium content of 40 ppm. Under gentle agitation (approximately 50 rpm), the internal temperature was raised to approximately 205° C. by jacket heating, and a metal emulsion was produced by means of the dispersant. Nitrogen was then introduced over a period of 10 minutes (approximately 0.1 L/60 s) under dispersion conditions. The dispersion agitator was then stopped, and the suspension was cooled to ambient temperature with gentle agitation. The suspension was poured onto a glass suction filter, and the filter residue was washed several times with hexane until free of oil and then vacuum dried.

Yield: 19.2 g (95% of theoretical) of a fine gray powder
Average particle size: 90 μm (FBRM particle size analyzer from Mettler-Toledo)
N content: 4.8% by weight
Metal content: 86% (gas volumetric)
Behavior in air: not pyrophoric
Stability in NMP, water content 167 ppm: stable for 15 h at 80° C.
Stability in $LiPF_6$, 10% in EC/EMC (1:1); EC/EMC (1:1), and 10% LiBOB in EC/EMC
(1:1): $T_{onset}$=150° C.; 170° C.; 190° C.
Surface analysis by XRD: phase components of $Li_3N$ and $Li_4NH$ EXAMPLE 2: Production of a Combined Passivated Lithium Metal Powder (Coating With Elemental Nitrogen and a Silicone Oil)

501 g Shellsol® D100 and 20.8 g lithium metal rod sections were placed in a dry 2-L stainless steel double-jacketed reactor equipped with a dispersion agitator mechanism and inerted with argon. The lithium had a sodium content of 40 ppm. Under gentle agitation (approximately 50 rpm), the jacket temperature was raised to 240° C. by jacket heating, and a metal emulsion was produced by means of the dispersant. 1.2 g polydimethylsiloxane (CAS No. 9016-00-6) dissolved in approximately 3 mL Shellsol® D100 was then added with a syringe over a period of 3 minutes. During the addition, the suspension was agitated with a strong shearing action. The dispersion agitator was then stopped, and nitrogen was introduced for 1 h (approximately 0.1 L/60 s). The suspension was then cooled to room temperature.

The suspension was poured onto a glass suction filter, and the filter residue was washed several times with hexane until free of oil and then vacuum dried.

Yield: 21.8 g (105% of theoretical)
Average particle size: $D_{50}$=59 μm (FBRM particle size analyzer from Mettler-Toledo)
Metal content: 95% (gas volumetric)
Stability in NMP, water content 167 ppm: stable for 15 h at 80° C.
Si content: 0.056% by weight
N content: 0.93% by weight
Surface analysis by XRD: small phase components of $Li_3N$ and $Li_4NH$ EXAMPLE 3: Production of a Low-Sodium Lithium Powder Coated With Pyrrole 501 g Shellsol® D100 and 20.4 g lithium metal rod sections were placed in a dry 2-L stainless steel double-jacketed reactor equipped with a dispersion agitator mechanism and inerted with argon. The lithium had a sodium content of 40 ppm. Under gentle agitation (approximately 50 rpm), the internal temperature was raised to 204° C. by jacket heating, and a metal emulsion was produced by means of the dispersant. 1.0 g pyrrole was then added with a syringe over a period of 3 minutes. During the addition, the suspension was agitated with a strong shearing action. The suspension was gently agitated for an additional 60 minutes at a jacket temperature of approximately 210° C., then the agitator was stopped, and the suspension was cooled to room temperature. The suspension was poured onto a glass suction filter, and the filter residue was washed several times with hexane until free of oil and then vacuum dried.

Yield: 20.9 g (102% of theoretical)
Average particle size $D_{50}$=57 μm (FBRM particle size analyzer from Mettler-Toledo)
Metal content: 92% (gas volumetric)
Stability in NMP, water content 167 ppm: stable for 15 h at 60° C.;
Stability in $LiPF_6$, 10% in EC/EMC (1:1); EC/EMC (1:1), and 10% LiBOB in EC/EMC
(1:1): $T_{offset}$=135° C.; 145° C.; 185° C.
N content: 0.71% by weight
Surface analysis by XRD: small phase components of $Li_3N$ and an unknown phase COMPARATIVE EXAMPLE 1: Reactivity of Commercial Lithium Metal Foil With Dry Air 38.072 g lithium metal foil, battery quality, was stored in an open glass dish in a drying chamber having a dew point of −40° C. and temperatures around 25° C. The shell was weighed after certain time intervals:

| Storage period (hours) | Change in weight (%) |
| --- | --- |
| 1 | 0.01 |
| 2 | 0.02 |
| 7 | 0.03 |
| 53 | 0.06 |
| 101 | 0.09 |

It is apparent from the measurement data that lithium foil in dry air reacts extremely slowly with nitrogen. The increase in weight corresponds to the absorption of the reactive components in the air (i.e., the sum based on the reaction with oxygen, nitrogen, carbon dioxide, and residual water content). The increase in weight is markedly lower in a pure nitrogen atmosphere.

The invention claimed is:
1. A method for producing a stabilized lithium metal form of granules, characterized in that lithium metal with a sodium content less than 200 ppm is brought into contact with one or more nitrogen-containing passivating agent(s) selected from the groups
$N_2$
$N_xH_y$ with x=1 or 2 and y=3 or 4, or
a compound containing only the elements C, H, and N, and optionally Li at temperatures in the range above the melting point of lithium of 180.5° C.,
wherein the contacting between lithium metal and the one or more nitrogen-containing passivating agent(s) first takes place in an inert organic solvent under dispersion conditions and a molar ratio of Li metal to passivating agent is in a range of 100:0.01 to 100:10.
2. The method according to claim 1, characterized in that said lithium metal has a sodium content less than 100 ppm.

3. The method according to claim 1, characterized in that said lithium metal has a sodium content less than 50 ppm.

4. The method according to claim 1, characterized in that gaseous sources of nitrogen, liquid compounds, or substances that are capable of releasing nitrogen are used as nitrogen-containing passivating agents.

5. The method according to claim 4, characterized in that gaseous sources of nitrogen are selected from elemental nitrogen or ammonia.

6. The method according to claim 4, characterized in that liquid nitrogen-containing passivating agent(s) is hydrazine.

7. The method according to claim 4, characterized in that substances that are capable of releasing nitrogen are selected from lithium azide (LiN3) or organic azides (RN3).

8. The method according to claim 1, characterized in that organic substances which contain no other chemical elements besides C, H, N, and optionally Li are used as nitrogen-containing coating agents selected from primary, secondary, or tertiary aliphatic amines $NR^1R^2R^3$, where $R^1$, $R^2$ independently stand for H or an aliphatic group containing 1 to 12 C atoms or an aromatic group containing at least 6 C atoms, and $R^3$ independently stands for an aliphatic group containing 1 to 12 C atoms or an aromatic group containing at least 6 C atoms; nitrogen-containing 3- to 6-membered heterocycles.

9. The method according to claim 8, characterized in that nitrogen-containing 3- to 6-membered heterocycles are selected from azirines, aziridines, pyrrolidines, pyrroles, N-methylpyrrole, pyridines, imidazole.

10. The method according to claim 8, characterized in that as organic substances which contain no other chemical elements besides C, H, N, and Li lithium salts are used of a primary or secondary aliphatic or aromatic amine, selected from lithium diisopropyl amide; lithium pyrrolidide.

11. The method according to claim 1, characterized in that the molar ratio of Li metal to passivating agent is in the range of 100:0.05 to 100:5.

12. The method according to claim 1, characterized in that hydrocarbons selected from the group comprising hexane, heptane, octane, decane, undecane, dodecane, toluene, ethylbenzene, and cumene, either in pure form or in a mixture as commercially available boiling fractions, are used as inert organic solvent.

13. A stabilized particulate lithium metal received by the method according to claim 1 characterized in that the stabilized particulate lithium metal has a granular form and a core composed of metallic lithium, and the core is enclosed by an outer passivating layer containing nitrogen wherein that outer passivating layer containing nitrogen has a thickness between 0.01 and 1 μm and contains or is composed of at least one lithium nitrogen compound selected from the group $Li_3N$, $Li_4NH$, $Li_2NH$, $LiNH_2$.

14. The stabilized particulate lithium metal according to claim 13, characterized in that the stabilized particulate lithium metal contains in the range of 0.01 to 10% by weight nitrogen.

15. The stabilized particulate lithium metal according to claim 13, characterized in that the stabilized particulate lithium metal has an average particle size of 5000 μm maximum.

16. The stabilized particulate lithium metal according to claim 15, characterized in that the stabilized particulate lithium metal has an average particle size of 1000 μm maximum.

17. The stabilized particulate lithium metal according to claim 15, characterized in that the stabilized particulate lithium metal has an average particle size of 300 μm maximum.

18. The stabilized particulate lithium metal according to claim 13, characterized in that the stabilized particulate lithium metal does not exhibit a "runaway" phenomenon, when in contact with N-methyl-2-pyrrolidone, with a water content of approximately 200 ppm, for at least 15 hours at 50° C.

19. The stabilized particulate lithium metal according to claim 18, characterized in that the stabilized particulate lithium metal does not exhibit a "runaway" phenomenon, when in contact with N-methyl-2-pyrrolidone, with a water content of approximately 200 ppm, for at least 15 hours at 80° C.

* * * * *